United States Patent
Stapel

(10) Patent No.: US 6,796,562 B2
(45) Date of Patent: Sep. 28, 2004

(54) CYLINDER HEAD GASKET THAT FILLS GAPS ARISING FROM LOCAL DEPRESSIONS IN THE AREA OF THE PRESSURE LIMITER

(75) Inventor: Klaus Stapel, Siegen (DE)

(73) Assignee: Federal-Mogul Sealing Systems, Herdorf (DE)

( * ) Notice: Subject to any disclaimer, the term of this patent is extended or adjusted under 35 U.S.C. 154(b) by 0 days.

(21) Appl. No.: 10/318,701

(22) Filed: Dec. 13, 2002

(65) Prior Publication Data

US 2003/0127805 A1 Jul. 10, 2003

(30) Foreign Application Priority Data

Jan. 9, 2002 (DE) .......................................... 102 00 544

(51) Int. Cl.$^7$ ................................................ F02F 11/00
(52) U.S. Cl. ........................................ 277/594; 277/593
(58) Field of Search ................................ 277/592, 593, 277/594, 595, 596

(56) References Cited

U.S. PATENT DOCUMENTS

| | | |
|---|---|---|
| 4,836,562 A | 6/1989 | Yoshino |
| 5,542,683 A * | 8/1996 | Papendorf et al. .......... 277/594 |
| 5,639,101 A | 6/1997 | Tanaka et al. |
| 6,206,381 B1 | 3/2001 | Ii et al. |

FOREIGN PATENT DOCUMENTS

| | | |
|---|---|---|
| DE | 19625491 | 10/1997 |
| DE | 10029352 | 12/2001 |
| EP | 0533357 | 3/1993 |
| EP | 0606567 | 11/1993 |
| EP | 0740092 | 10/1996 |
| EP | 1128099 | 8/2001 |
| JP | 8-178070 | * 7/1996 |

* cited by examiner

Primary Examiner—William L. Miller
(74) Attorney, Agent, or Firm—Howard & Howard

(57) ABSTRACT

A metal cylinder head gasket for combustion engines with inserted cylinder linings has at least two functional plates with openings according to the combustion powered machines' combustion chambers that are encircled by full beads of the functional plates. On the first functional plate, a pressure limiter for the full bead is positioned on the side facing the second functional plate. An elastic feature is associated with the second functional plate in line with the pressure limiter.

14 Claims, 1 Drawing Sheet

Figure 1:
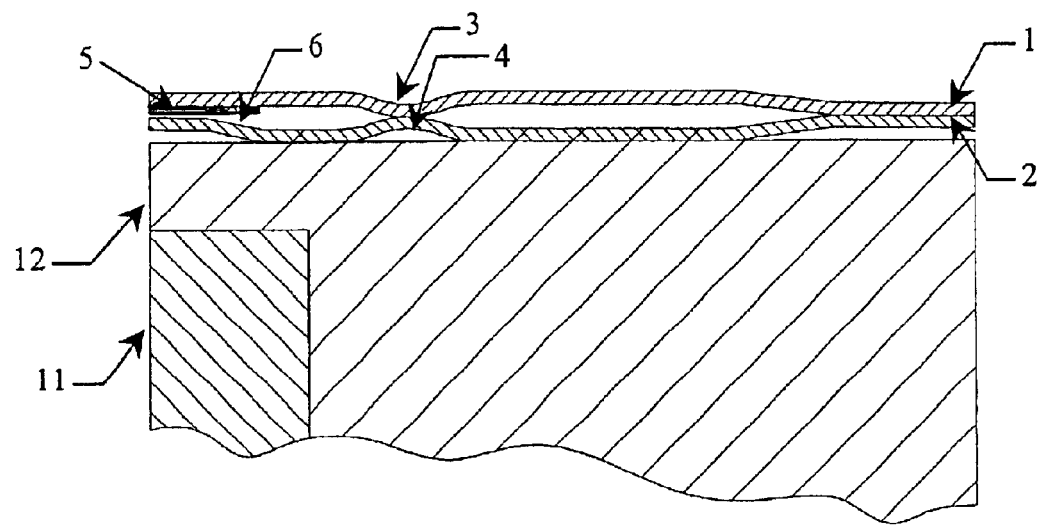

CYLINDER HEAD GASKET THAT FILLS GAPS ARISING FROM LOCAL DEPRESSIONS IN THE AREA OF THE PRESSURE LIMITER

BACKGROUND OF THE INVENTION

1. Technical Field

The present invention concerns a metal cylinder head gasket.

2. Related Art

In the case of engines with inserted cylinder liners, local depressions often occur in the area of the pressure limiter due to high temperatures. Conventionally inserted cylinder head gaskets cannot conform to the profile of these depressions and fill the resulting gaps. This causes wear and results in leaks between the sealing surfaces of the cylinder head and engine block.

From JP 08178070 a cylinder head gasket is already known that has a functional plate featuring an additional half bead in the area facing the combustion chamber, or that has a second functional plate on the inner side of the first functional plate, serving to prevent the emergence of additional stresses when a gap arises between the cylinder head and the lining. However such a cylinder head gasket is not able to satisfy the requirements for flexibility and sealing ability at the same time.

It is the task of the present invention, therefore, to develop the known cylinder head gasket from the state of the art, in such a way that it is able to fill gaps arising from local depressions in the area of the pressure limiter, in particular in the case of engines with cylinder linings.

SUMMARY OF THE INVENTION

This is achieved by locating a pressure limiter for a full bead on a first functional plate on the side of the latter that faces a second functional plate, and by locating a plate having an elastic element in or on the second functional plate in the plane of the pressure limiter. The elastic element extends in the vertical plane of the pressure limiter. The elastic element increases the surface pressure in such a way that there is a sufficient sealing pressure at any given time because the elastic element of the second functional plate makes it possible for the cylinder head gasket to conform, with permanent elasticity, to the profile of the depressions in the cylinder lining.

Preferably, the pressure limiter is a ring insert that is preferably joined to the first functional plate by welding in such a way that they are gas-tight in relation to one another. This is optimally achieved by spot-welding the ring insert to the first functional plate.

The elastic element preferably comprises a half bead. Half beads are preferable to full beads for spatial reasons, i.e., due to space requirements, and also due to their specific surface pressure. A half bead presses against the adjacent plate on each side over one of the two contact areas so as to provide essentially the same specific surface pressure, in the installed position, over both of the cylinder head gasket's two contact areas—whereas in the case of a full bead, which presses against adjacent plates over one contact area on one side and over two contact areas on the other side, the specific surface pressure on one side is only half as great as on the other side.

According to a preferred embodiment, the plate with the half bead is joined to the second functional plate as one piece, so that material is saved and failure-prone or defect-prone areas are obviated because there are no weld seams and the like.

In a preferred embodiment, the area bordering the half bead is planar. The sealing pressure is thus further increased. The pressure limiter is preferably also planar.

In the installed position, the elastic element is supported on the cylinder lining in order to achieve as high an elasticity as possible and thus as high a compensation as possible of uneven stresses as well as an improved sealing in this area.

Furthermore, at least one more bearing plate can be positioned either between the first and second functional plates or below the second functional plate. By using additional plates, the surface pressure and sealing ability can be controlled and varied.

THE DRAWINGS

Figure 2:
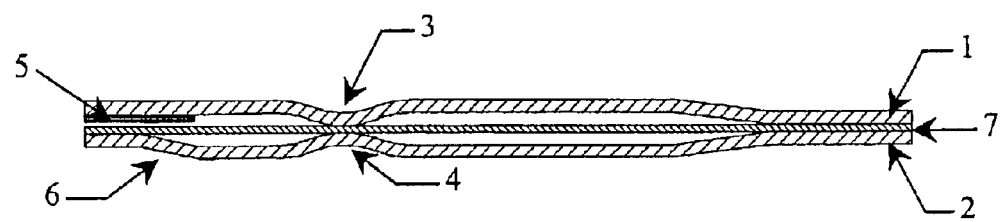
Figure 3:
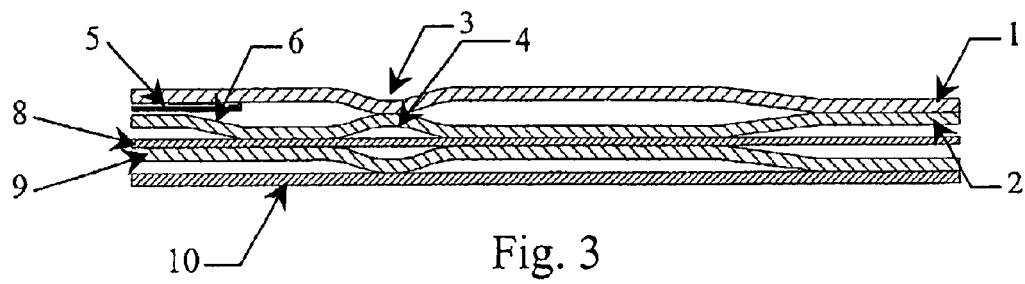

The present invention is shown by means of sample embodiments in the attached drawings and will be further explained in the following. Please note that:

FIG. 1 represents a cross-section according to a first embodiment of the metal cylinder head gasket according to the present invention, FIG. 2 represents a cross-section according to a second embodiment of the metal cylinder head gasket according to the present invention, FIG. 3 represents a cross-section according to a third embodiment of the metal cylinder head gasket according to the present invention.

DETAILED DESCRIPTION

In the case of the embodiment shown in FIG. 1, namely of a metal cylinder head gasket according to the present invention, two functional plates 1, 2 are provided with openings according to the combustion chambers of combustion powered machines and each with a full bead 3, 4 enclosing the combustion chambers. On the first functional plate 1, a pressure limiter 5 for the full bead 3 is positioned on the side facing the second functional plate 2, and on or in the second functional plate 2, a plate with an elastic element 6 is located in the plane of the pressure limiter 4 [sic]. Thus this area is made flexible so as to conform, with permanent elasticity, to the depressions of the lining 11 or the dowsed area 12, so that even with irregular and/or uneven stresses, sufficient surface pressure is provided for secure sealing. With reference to FIG. 1, the elastic element 6 is preferably a half bead.

In the case of the embodiment shown in FIG. 2 of a metal cylinder head gasket according to the present invention, another bearing plate 7 is positioned between the two functional plates 1, 2 described according to FIG. 1. The bearing plate 7 according to FIG. 2 is planar but can be if needed have a crown; can be a distancing plate, a compensating plate, or a functional plate. The bearing plate 7 can extend up to or onto the cylinder lining, so that it lies on top of the lining. A variation of the thickness of the bearing plate 7 is also possible. The bearing plate 7 can have either a pre-determined constant thickness or a varying thickness, so that surface pressure can be controlled.

In the case of the embodiment shown in FIG. 3 of a metal cylinder head gasket according to the present invention, three other bearing plates 8, 9, 10 are positioned below the second functional plate 2. With reference to FIG. 3, the bearing plate 8 is a planar plate that is positioned in order to support the beads located on the functional plate 2 and the bearing plate 9. The beads of bearing plate 9 are additionally supported by the adjacent bearing plate 10. The above mentioned bearing plates 8, 9, 10 can comprise distancing plates and/or functional plates. In this embodiment, the carrier plates 8, 9, 10 can have differing thicknesses.

In the case of all of the above embodiments, the flexibility of the pressure limiter area is increased so that the metal cylinder head gasket can be better adapted to the conditions of the cylinder lining and the engine block. The usual leakage is thereby prevented.

Alternatively, the first and second functional plate 1, 2 can be provided with additional beads. Furthermore, the functional plates 1, 2 and/or the bearing plates 7, 8, 9, 10 can be manufactured from various materials. The functional plates 1, 2 and/or bearing plates 7, 8, 9, 10 can also be provided with a coating that serves as a micro-sealant between the cylinder head gasket and the bordering surfaces of the cylinder lining and the engine block or provides the plates with specific desired surface characteristics. The plates 1, 2, 7, 8, 9, 10 can be flat and planar or profiled.

What is claimed is:

1. A metal cylinder head gasket for combustion engines with cylinder liners inserted in combustion chambers of the engine, said gasket comprising:

at least first and second metal functional layers formed with vertically aligned combustion openings associated with the combustion chambers of the engine;

each of said first and second functional layers being formed with a full bead encircling each of the combustion openings and vertically aligned with each other;

a pressure limiting plate disposed on an inward surface of said first layer facing said second layer in surrounding adjacent relation to said combustion openings and extending toward but terminating short of said full beads so as to be limited to an area of said first layer between said combustion openings and said full beads; and an elastically compressible half bead associated with said second layer surrounding each of said combustion openings and arranged vertically opposite said pressure limiting plate.

2. The gasket of claim 1 wherein said half bead is formed on said second layer radially inwardly of said full beads.

3. The gasket of claim 1 wherein said second layer includes a planar portion surrounding said combustion openings radially inwardly of said half beads.

4. The gasket of claim 1 wherein said pressure limiting plate is planar.

5. The gasket of claim 1 wherein said pressure limiting plate comprises a plurality of ring inserts.

6. The gasket of claim 5 wherein said ring inserts are welded to said first layer.

7. The gasket of claim 1 wherein said elastically compressible feature is engagable with said pressure limiting plate under compression of said gasket in an installed position.

8. The gasket of claim 7 including at least one additional bearing plate is disposed below said second layer such that said second layer is between said additional bearing plate and said first layer.

9. The gasket of claim 1 including a bearing plate positioned between said first and second layers.

10. The gasket of claim 1 wherein said full beads of said first and second layers extend toward each other.

11. The gasket of claim 1 wherein said full beads of said first and second layers contact each other.

12. The gasket of claim 1 wherein said elastically compressible feature extends from said second layer toward said first layer.

13. The gasket of claim 12 wherein said elastically compressible feature comprises a half bead formed in said second layer about each of said combustion openings.

14. A metal cylinder head gasket for combustion engines with cylinder liners inserted in combustion chambers of the engine, said gasket comprising:

at least first and second metal functional layers formed with aligned combustion openings associated with the combustion chambers of the engine;

each of said first and second functional layers being formed with a full bead encircling each of the combustion openings and extending toward each other;

a pressure limiting ring welded to an inward surface of said first layer facing said second layer in surrounding adjacent relation to said combustion openings and extending toward but terminating short of said full beads so as to be limited to an area of said first layer between said combustion openings and said full beads; and a half bead formed on said second layer about each of said combustion openings at locations radially inwardly of said full beads and opposite said pressure limiting ring of said first layer and spaced from said combustion openings by a annular planar portions of said second layer immediately bordering said combustion openings.

* * * * *